United States Patent
Steenackers et al.

(10) Patent No.: US 6,298,935 B1
(45) Date of Patent: Oct. 9, 2001

(54) EXHAUST SYSTEM FOR A MOTOR VEHICLE AND A MOTOR VEHICLE WITH THE EXHAUST SYSTEM

(75) Inventors: Pieter Delfina Steenackers, Heverlee; John W. Jörg Alexnat, Tongeren, both of (BE)

(73) Assignee: Scambia Industrial Developments AG, Schaan (LI)

( * ) Notice: Subject to any disclaimer, the term of this patent is extended or adjusted under 35 U.S.C. 154(b) by 0 days.

(21) Appl. No.: 09/466,240

(22) Filed: Dec. 17, 1999

(51) Int. Cl.$^7$ .................................................. E21F 17/02
(52) U.S. Cl. ............................ 180/89.2; 180/296; 248/58
(58) Field of Search ..................... 180/89.2, 296, 180/309; 248/58, 60, 62; 181/212, 227, 228; 29/890.08; 60/299, 301, 322, 323

(56) References Cited

U.S. PATENT DOCUMENTS

| | | | |
|---|---|---|---|
| 2,288,172 | * | 6/1942 | Ulrich ...................................... 248/58 |
| 2,367,753 | * | 1/1945 | Buck ................................... 29/890.08 |
| 2,912,198 | * | 10/1959 | Feil, Jr. .................................... 248/58 |
| 3,199,815 | * | 8/1965 | Martinkovic et al. ................. 248/58 |
| 3,242,558 | * | 3/1966 | Selig ................................... 29/890.08 |
| 3,270,992 | * | 9/1966 | Cassell ..................................... 248/60 |
| 3,745,632 | * | 7/1973 | Malkki et al. ....................... 29/890.08 |
| 3,863,445 | * | 2/1975 | Heath ................................... 180/89.2 |
| 3,908,372 | * | 9/1975 | Fowler et al. . |
| 4,201,048 | | 5/1980 | Fisher et al. . |
| 4,305,179 | * | 12/1981 | Sakurada . |
| 4,361,304 | * | 11/1982 | Younger ................................. 248/58 |
| 4,547,942 | * | 10/1985 | Fukuda ............................... 29/890.08 |
| 4,564,987 | * | 1/1986 | Roberts .............................. 29/890.08 |
| 4,858,860 | * | 8/1989 | Richards ................................ 248/62 |
| 5,329,698 | * | 7/1994 | Abbott ............................... 29/890.08 |
| 5,398,907 | * | 3/1995 | Kelchner ............................. 248/60 X |
| 5,448,831 | * | 9/1995 | Harwood ........................... 29/890.08 |
| 5,765,878 | | 6/1998 | Pierr Bonny et al. . |
| 6,058,702 | | 5/2000 | Alexnat et al. . |
| 6,173,800 | * | 1/2001 | Steenackers et al. ............... 180/89.2 |

FOREIGN PATENT DOCUMENTS

| | | |
|---|---|---|
| 3026730 | 2/1982 | (DE) . |
| 3137746 | 6/1983 | (DE) . |
| 29711764 | 10/1997 | (DE) . |
| 0875409 | 11/1998 | (EP) . |
| 0875410 | 11/1998 | (EP) . |

* cited by examiner

Primary Examiner—Brian L. Johnson
Assistant Examiner—Bryan Fischmann
(74) Attorney, Agent, or Firm—Sidley Austin Brown & Wood, LLP

(57) ABSTRACT

The exhaust system has an exhaust with at least one silencer and/or catalytic converter which has a housing having a housing casing with a wall thickness of not more than 1 mm and having housing ends, and metallic pipes which are rigidly connected to the latter and at least one of which has a wall thickness of, likewise, not more than 1 mm. The retaining means for holding the exhaust on the vehicle body have, for each housing end, a metallic retaining member connected to the pipe adjacent to the housing end. The at least one pipe with a wall thickness of not more than 1 mm is surrounded by a sleeve to which the retaining member is fastened, for example by welding or brazing or adhesive bonding.

16 Claims, 2 Drawing Sheets

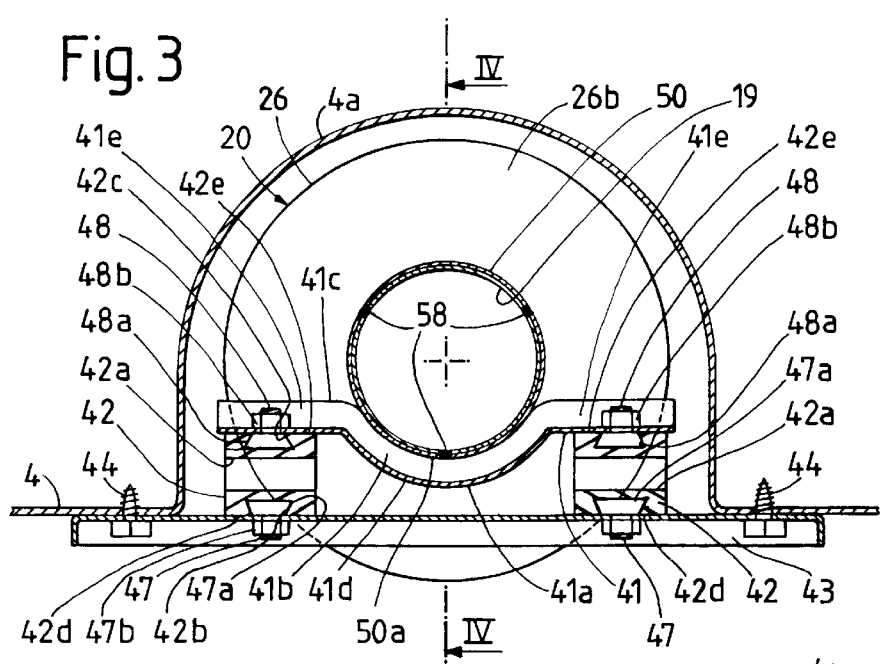
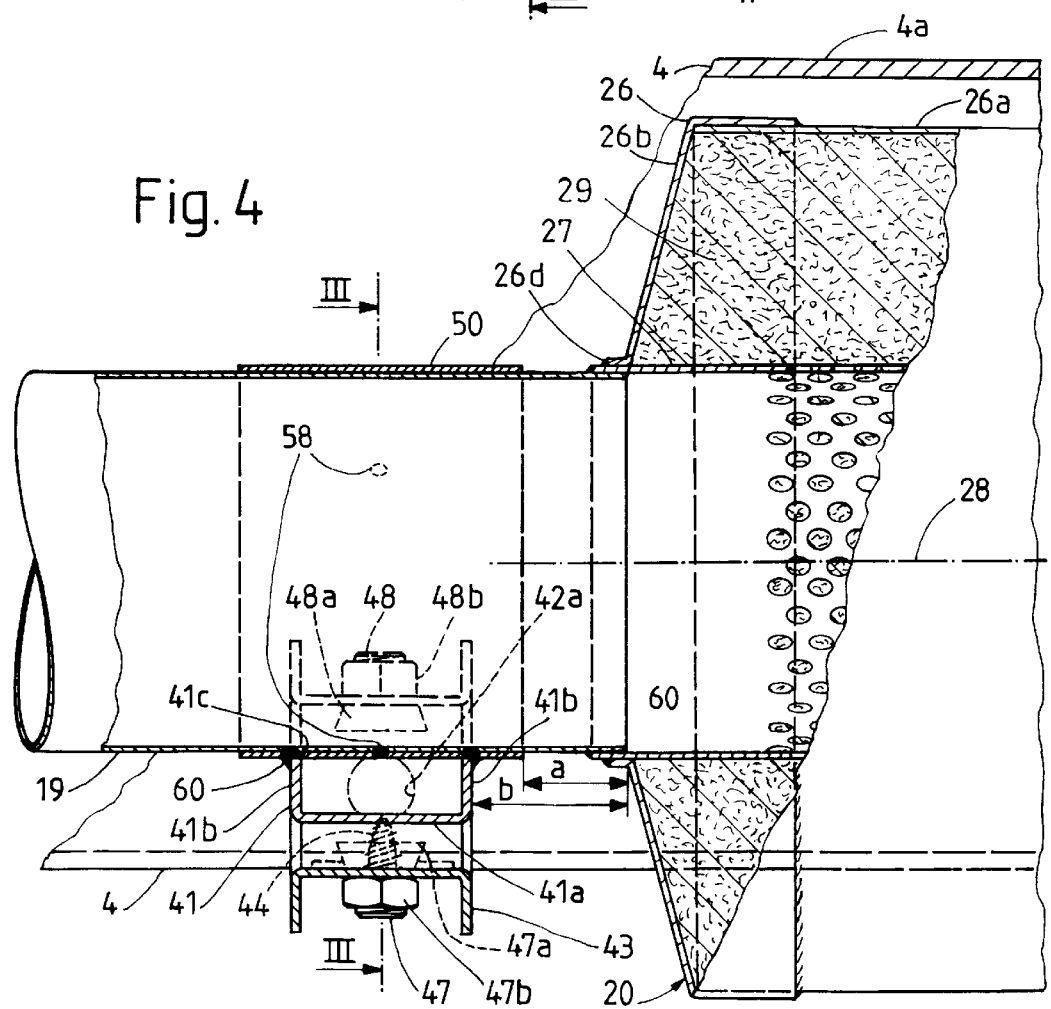

EXHAUST SYSTEM FOR A MOTOR VEHICLE AND A MOTOR VEHICLE WITH THE EXHAUST SYSTEM

BACKGROUND OF THE INVENTION

1. Field of the Invention

The invention relates to an exhaust system for a motor vehicle comprising a vehicle body and an internal combustion engine. The exhaust system has an exhaust which is intended for connection to the internal combustion engine and has at least one housing of a silencer and/or of a catalytic converter with a housing casing, having essentially a wall thickness of not more than 1 mm, and two housing ends and metallic pipes rigidly connected to the latter. The exhaust system furthermore has retaining means for holding the exhaust on the vehicle body.

The exhaust system is intended, for example, for a car but may also be used for another motor vehicle—for example a truck or bus. The internal combustion engine may consist of a gasoline or diesel engine.

2. Description of the Prior Art

European Patent Application Publication 0 807 749 and the corresponding U.S. Pat. No. 6,058,702 disclose exhaust systems which have pipes, a catalytic converter and at least one silencer, at least one of the pipes, the casing and the end walls of the housing of the or each silencer having a wall thickness of not more than 1 mm and preferably not more than 0.8 mm. Thanks to this light-weight construction, such an exhaust system has a very low weight. The exhaust systems have retaining means with holders which connect the housing of each silencer, in the vicinity of the housing ends, to the bottom of the vehicle. The holders have, for example, metallic retaining members fastened to the housing casing by spot welding or another welding method. Owing to the small material thickness of the housing casing, however, it is difficult to weld the retaining members in a stable manner to the housing casing without holes being formed in the latter. At least a part of the exhaust system and in particular at least one silencer are arranged in the tunnel of the vehicle bottom. Furthermore, there is generally only a small amount of space between the vehicle bottom and the surface on which the vehicle stands or drives. However, the holders fastened to the housing casing also occupy a certain height and reduce the height region available for the housing casing and hence the maximum possible cross-sectional dimensions of the silencer and its silencing effect.

German Patent Application Publications 30 26 730 and 31 37 746 disclose exhaust systems in which the housing of a silencer or pipes of the exhaust are suspended from the vehicle body by means of at least one rubber ring. If a force is exerted on an exhaust part held in this manner, the rubber rings initially offer only very little resistance to a deflection of the exhaust from its rest position. Only when the deflections of the exhaust parts reach limits of about 1 cm to 2 cm or even more does the resistance generated by the rubber rings increase abruptly. Retaining means comprising at least one rubber ring therefore have the disadvantage that the or each suspended part is virtually freely movable in particular upward and also in all approximately horizontal directions within certain ranges which are usually at least 1 cm or more. Exhaust parts suspended in this manner must therefore be large distances away from the vehicle body and—in the case of the arrangement in the tunnel of the vehicle bottom—in particular from the walls of the tunnel. Furthermore, exhaust parts suspended in this manner and the parts connected to them must have thick walls so that the exhaust is sufficiently strong.

SUMMARY OF THE INVENTION

It is the object of the present invention to provide an exhaust system which avoids disadvantages of the known exhaust systems and whose exhaust, particularly in the case of a thin-walled embodiment of the or each housing casing and of at least one pipe connected to the housing, can be connected permanently to the vehicle body by the retaining means without damage to the or each housing. Furthermore, it is intended to ensure that the or at least one housing can be readily accommodated in the tunnel of the vehicle bottom and can have a large vertical cross-sectional dimension. Furthermore, the retaining means should be capable of being economically manufactured and mounted and should permit good vibration damping.

This object is achieved, according to the invention, by an exhaust system for a motor vehicle having a vehicle body and an internal combustion engine, comprising an exhaust which is intended for connection to the internal combustion engine and has at least one housing of at least one of a silencer and of a catalytic converter with a housing casing, having essentially a wall thickness of not more than 1 mm, and two housing ends and metallic pipes which are rigidly connected to the latter and at least one of which has a wall thickness of not more than 1 mm, and comprising retaining means for holding the exhaust on the vehicle body, wherein the retaining means have a metallic retaining member for each pipe connected to a housing end and wherein a sleeve surrounding the or each pipe connected to a housing end and having a wall thickness of not more than 1 mm is fastened to said pipe, the retaining member being fastened to said sleeve.

According to another object of the invention, there is provided a motor vehicle having a vehicle body, an internal combustion engine, an exhaust system and wheels which rest on a horizontal surface when a motor vehicle is in a normal position, wherein the exhaust system comprises an exhaust which is connected to the internal combustion engine and has at least one housing of at least one of a silencer and of a catalytic converter with a housing casing, having essentially a wall thickness of not more than 1 mm, and two housing ends and metallic pipes which are rigidly connected to the latter and at least one of which has a wall thickness of not more than 1 mm, and comprising retaining means holding the exhaust on the vehicle body, wherein the retaining means have a metallic retaining member for each pipe connected to a housing end and wherein a sleeve surrounding the or each pipe connected to a housing end and having a wall thickness of not more than 1 mm is fastened to said pipe, the retaining member being fastened to said sleeve, wherein, in the normal position, a lowest point of at least one housing is below a lowest point of the retaining members coordinated with this housing.

An exhaust system according to the invention has at least one silencer and/or a catalytic converter whose housing has a casing which is for instance tubular and/or sleeve-shaped and hence annular in cross-section and has a wall thickness which is essentially 1 mm or less. Furthermore, at least one and preferably each of the two pipes connected to the housing, and preferably also each end wall of the housing, has essentially a wall thickness of not more than 1 mm. The wall thicknesses of the housing casing, of the housing end walls and of the or each said pipe are preferably essentially not more than 0.8 mm and, for example, 0.5 mm to 0.7 mm or possibly even less than 0.5 mm. The wall thickness of the or each sleeve is expediently likewise not more than 1 mm, preferably not more than 0.8 mm and, for example, about 0.5 mm to 0.7 mm. Nevertheless, the retaining members of the retaining means can be connected to the pipes by welding or by brazing since, owing to the sleeve or sleeves pushed onto at least one pipe, the retaining means need not be welded or soldered directly to thin-walled parts and therefore furthermore no holes form or other damage results. A welded or brazed joint is more advantageous in manufacture, stronger and more stable than a screw connection.

Because the sleeve or sleeves surrounds or surround at least one of the pipes and therefore the retaining means need not engage the housing of a silencer and/or of a catalytic converter, for example, a housing in a tunnel having predetermined cross-sectional dimensions can have a larger vertical cross-sectional dimension than if retaining means were to engage the housing casing.

According to a preferred embodiment of the invention, the retaining member, the sleeve and the pipe are connected by at least a single weld joint which, during the manufacture of the exhaust system, was produced in a single welding operation and then simultaneously connects the retaining member and the sleeve on the one hand and the sleeve and the pipe on the other hand. This makes the manufacture of the exhaust system according to the invention very efficient, and this is therefore not only light but also particularly economical. Even if the wall thicknesses of the pipe and of the sleeve are, for example, each only about 0.5 mm and the retaining member, the sleeve and the pipe were connected to one another by at least one common weld joint, namely weld seam, the wall thicknesses of the sleeve and of the pipe together are sufficient to avoid the formation of holes in the pipe.

In an advantageous embodiment, the retaining means have vibration-damping elements so that vibrations of the exhaust system are not transmitted to the vehicle body and, conversely, vibrations thereof are not transmitted completely to the exhaust system which is sensitive particularly in the light-weight construction. These damping elements consist, for example, of an elastomeric member. According to an advantageous embodiment of the motor vehicle according to the invention, the retaining means are formed in such a way that the damping elements rest on top of connecting elements connected rigidly to the vehicle body, namely to the vehicle bottom, and are fastened to said connecting elements. The retaining members, which in turn are rigidly connected to the exhaust, can then rest on top of the damping elements and may be connected to them. This arrangement has the advantages that the elastomeric members are loaded by the weight of the exhaust essentially only under pressure, and, if the elastomeric material breaks, the exhaust does not fall onto the driving surface but is still supported by the connecting elements.

BRIEF DESCRIPTION OF THE DRAWINGS

An embodiment of the exhaust system according to the invention, of the motor vehicle and of the process for manufacturing the exhaust system is described below with reference to a drawing. In the drawing, FIG. 3 shows a cross-section through the bottom of the motor vehicle, along the line III—III in FIG. 4, which in turn shows a longitudinal section along the line IV—IV in FIG. 3, but on a scale differing from that of FIG. 3.

DESCRIPTION OF THE PREFERRED EMBODIMENTS

Figure 1:
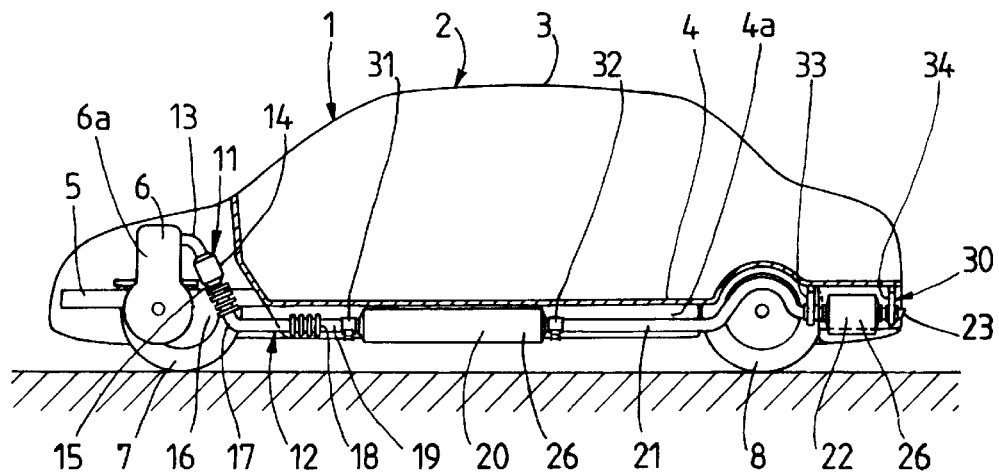
FIG. 1 shows a very schematic longitudinal section through a motor vehicle.

The motor vehicle 1 shown schematically in FIG. 1 is a car and has a vehicle body 2. This has a self-supporting bodywork 3, a vehicle bottom 4 and a chassis 5. The vehicle body 2 holds an internal combustion engine 6, front wheels 7, rear wheels 8 and an exhaust system denoted as a whole by 11. The internal combustion engine 6 has an engine housing 6a fastened in a vibration-damping manner to the chassis 5 and having a plurality of exhaust gas outlets, each of which is coordinated with a cylinder of the engine. The exhaust system 11 has, as a main component, an exhaust 12. This has, in order in the direction of flow of the exhaust gas, an inlet and collecting apparatus 13, a catalytic converter 14, a connection 15, a first elastically deformable pipe element 16, a bent pipe 17, a second elastically deformable pipe element 18, a short pipe 19, a first silencer 20, a longer, bent pipe 21, a second silencer 22 and a short outlet pipe 23 opening into the environment. The internal combustion engine 6 is at the front end of the motor vehicle 1. The exhaust 12 extends from the internal combustion engine to the rear of the motor vehicle 1 and is for the most part underneath the vehicle bottom 4. The exhaust system 11 furthermore comprises retaining means 30. These have four holders 31, 32, 33, 34 which connect the pipes 19, 21, 23 of the exhaust 12 to a rigid part of the vehicle body 2, namely to the vehicle bottom 4. Considering the direction of flow, one holder each is mounted in front of and behind each silencer 20, 22 and in the vicinity thereof, so that each silencer is connected to the vehicle bottom via short pipe sections and two holders coordinated with it.

The inlet and collecting apparatus 13 has an exhaust manifold which has a bent inlet pipe for each exhaust gas outlet of the engine and a common exit for all inlet pipes. The catalytic converter 14 has a rigid housing with an entrance which is connected rigidly to the common exit of the inlet and collecting apparatus 13. The pipes 15, 17, 20, 22, 23 are rigid. The inlet and collecting apparatus 13, the housing of the catalytic converter 14 and the pipes 17, 19, 21 and 23 and any pipe present at the connection 15 consist of metallic materials, for example stainless steel, and are rigid. The pipes 17, 19, 21 and 23 and possibly any pipe 15 present at the connection are manufactured as light-weight constructions, i.e. they have wall thicknesses of not more than 1 mm, preferably not more than 0.8 mm and, for example, about 0.5 mm to 0.7 mm. The two elastically deformable pipe elements 16 and 18 have, for example, a flexible, pliable bellows which consists of stainless steel and can be lengthened and shortened. The successive parts 13 to 23 are connected tightly to one another and, for example, welded or connected by brazing.

Figure 2:
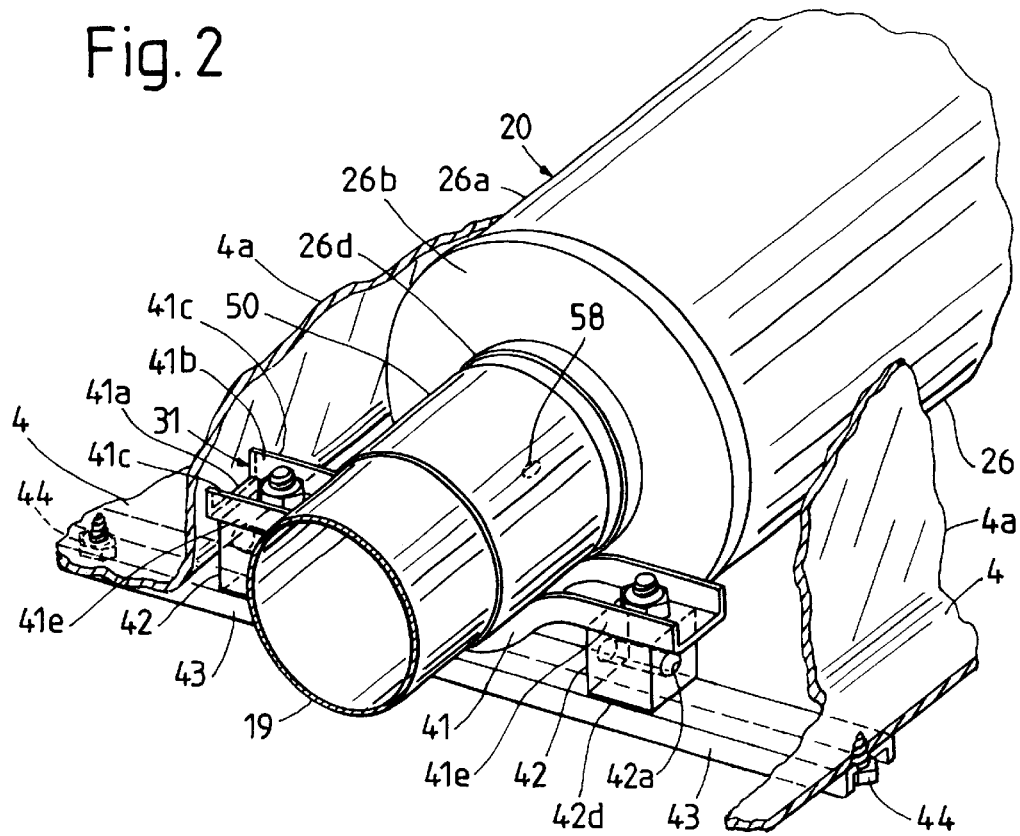
FIG. 2 shows an oblique view of a part of a silencer of an exhaust system according to the invention.

Each of the silencers 20, 22 has a housing 26, of which that of silencer 20 is also shown in FIGS. 2, 3 and 4. Each housing 26 consists of a metallic material, for example stainless steel, and has a tubular and/or sleeve-shaped housing casing 26a and two end walls 26b. The housing casing 26a of each silencer is circular in cross-section, for example according to FIG. 3, but could instead be more or less oval. The housing defines a housing axis 28 encompassed by the housing casing 26a. The housing casing 26a is, as preferably the complete housing 26, free of retaining means engaging it. The housing end walls make for the most part and essentially an angle with the housing axis 28 and are, for example, approximately conical but could instead be perpendicular to the housing axis or curved, at least in parts, in axial section. The actual end wall making an angle with the housing axis is associated at its outer edge and in the central region with a short, approximately axial outer or inner collar and, together with this collar, consists of one sheet metal piece. The outer collar overlaps an edge region of a sheet metal piece forming the main part of the casing and is connected thereto, for example by welding or brazing. The inner collar forms a housing end 26d which is intended for connection to further exhaust parts, namely pipes. Furthermore, the silencer has, for example, at least one perforated inner pipe 27 and at least one interior region filled with a fibre material 29, such as, for example, glass fibres, basalt fibres, rock wool or a similar material. The inner collar of each end wall 26b bounds an orifice which, for example, is coaxial with the housing axis 28 but could also be offset therefrom. In the case of the end wall 26b shown in FIGS. 2 to 4, the collar is connected by weld joints or brazed joints to the inner pipe 27 and via this to the pipe 19 of the exhaust. The other housing end walls of the two silencers are each connected to an end of one of the pipes 21, 23 and possibly also to an inner pipe. The end sections of the pipes 19, 21, 23 connecting to the housing of one of the silencers have pipe axes which are parallel to the housing axis of the relevant housing and, for example, coincide with these housing axes. The casings and end walls have essentially, i.e. apart from the overlapping collars and edge regions, a wall thickness of the order of magnitude stated in the introduction. The inner pipe 27 and the end wall 26b of the housing and the inner pipe and the exhaust pipe 19, 21 or 23 are each rigidly connected to one another, for example soldered or welded.

FIGS. 2, 3 or 4 show a section of the vehicle bottom 4. This is in general more or less flat but has an upward-projecting bulge. This bounds a tunnel 4a which is open at the bottom in which at least a part of the exhaust 12 and in particular at least a cross-section area of the first silencer 20 are located.

As already mentioned, the retaining means have four holders 31, 32, 33 and 34, of which the holder 31 is shown in FIGS. 2 to 4. The holder 31 is formed by a retaining member 41, two damping elements 42 and a connecting element 43. The retaining member 41 and the connecting element 43 consist of metallic material, for example stainless steel. Each damping element consists of a one-piece, elastomeric member of synthetic and/or natural rubber. The connecting element 43 is elongated and straight and consists of a profile rod which has, on its upper side, a web and two limbs projecting downwards away from said web and, for example at its ends, end sections which are angled and/or bent away downward likewise away from the web. The connecting element 43 extends transversely to the tunnel 4a and to the housing axis 28 parallel to said tunnel, rests with its web on both sides of the tunnel against the lower surface of the vehicle bottom 4 and is rigidly connected thereto and in fact fastened thereto by means of two bolts 44, 45. The damping elements 42 are, for example, essentially right parallelepiped and have a through-hole 42a extending transversely to the housing axis 28, and recesses 42b and 42c, in each of which a head 47a, 48a of a bolt 47 and 48, respectively, is located. The bolt heads 47a, 48a are connected firmly and in an interlocking manner to the damping element 42, for example by casting on and/or vulcanizing on the rubber. The bottoms 42d of the damping elements rest on the connecting element 43 and possibly on the top of the bolt heads present there and are fixed to the connecting element by means of the bolts 47 and nuts screwed onto said bolts. The retaining member 41 has a U-profile in cross-section and possesses, on its lower side, a web 41a and two limbs 41b which project upward away from said web and have free edges 41c at the top. The retaining member has a middle, curved section 41 and two essentially straight arms 41e projecting away from the curved section 41d. The arms 41e rest on the top 42e of the damping elements 42 and possibly on the top of the bolt heads present there and are supported by these. The bolts 48 and the associated nuts 48b serve for fixing the retaining member 41 on the damping elements 42.

The pipe 19 is surrounded by a metallic sleeve 50 which consists, for example, of stainless steel and rests tightly against the pipe 19. The wall thickness of the sleeve is in the range stated in the introduction and is, for example, about 0.5 mm. The sleeve 50 is slightly broader than the retaining member 41 and rests, with a circumferential section 50a present on its lower side, in the curved section 41d of the retaining member 41, on those edges 41c of the limbs 41b which face away from the web 41a. Each edge 41c of a limb 41b is a small distance away from that end of the sleeve 50 which is closer to it. Each of the two edges 41c adjacent to the sleeve is connected to the retaining member 41 essentially along the entire circumferential section 50a of the sleeve 50 by a weld joint 60, i.e. a weld seam. The melt zone of the weld joint 60 penetrates through the wall of the sleeve 50 into the wall of the pipe 19. Each weld joint 60 therefore firmly and nondetachably connects both the retaining member 41 to the sleeve 50 and this to the pipe 19.

The sleeve 50 and the retaining member 41 are present as close to the housing 26 of the silencer as is easily feasible in terms of manufacturing technology. In FIG. 4, a denotes the distance of that end of the sleeve 50 which is closer to the housing 26 from the point, located closest to the sleeve and outermost in the axial direction, of the actual end wall 26b making an angle with the housing axis. In FIG. 4, furthermore, b denotes the distance of that point of the retaining member 41 which is located closest to the housing 26 from the point, located closest to said retaining member, of the end wall 26b present at the relevant housing end. Said point of the retaining member is formed by its limb 41b located closer to the housing. The said point of the end wall 26b is located at the inner edge thereof, at which the conical end wall is associated with the inner, axial collar. The distances a and b are measured parallel to the housing axis 28, along the pipe 19 and its pipe axis coinciding with the housing axis 28. The distance b is not more than 5 cm, preferably not more than 3 cm and, for example, about 2 cm or even less. The distance a is, for example, about 1 mm to 10 mm less than the distance b and is accordingly likewise not more than about 5 cm, expediently not more than 4 cm and, preferably, not more than 2 cm.

The holder 32 is formed identically or similarly to the holder 31.

If the motor vehicle stands or drives with its wheels on a flat, horizontal surface, it assumes a position denoted below as the normal position. In this position, the lowest point of the housing 26 of the first silencer 20 is lower than the lowest point of the two retaining members 41 which are coordinated with the first silencer and are located slightly upstream and downstream thereof. The whole retaining members 41 are therefore above the lowest point of the silencer 26. The housing 26 of the first silencer 20 furthermore projects, for example according to FIG. 3, out of the tunnel 4a in the downward direction, so that the lowest point of this housing in the normal position is approximately at the height of the lowest point of the connecting elements 42 and of the whole holders 31, 32 or even below these. Furthermore, the two metallic retaining members 41 coordinated with the first silencer, and at least the greatest parts of the damping elements 42 fastened to these rotating members, can be arranged inside the tunnel.

The second silencer 22 and its housing 26 are located, for example, behind the tunnel 4a. The two holders 33, 34 coordinated with this silencer and serving for indirectly holding said silencer are formed partly similar to the holders 31, 32 and likewise have, for example, a connecting element, two damping elements and a retaining member which is fastened to a sleeve 50 pushed onto the corresponding exhaust pipe. The retaining members 41 of the two holders 33, 34 are arranged, for example analogously to the retaining members 41 of the holders 31, 32, on the lower side of the pipes 21 or 23 and sleeves 50 supported by them. The damping elements of the holders 33, 34 can likewise be formed identically or similarly to those of the holders 31, 32. On the other hand, the connecting elements of the two holders 33, 34 are then not straight but, for example, angled or bent in such a way that they can be fastened, for example above the second silencer, to the vehicle bottom 4 and possibly to another part of the vehicle body.

In the case of the relatively short pipes 19 and 23, it is however also possible that no sleeve 50 is present, and the retaining members 41 are welded directly to the pipes 19, 23. The pipes 19, 23 are then not manufactured as a light-weight construction and have wall thicknesses of more than 1 mm.

The exhaust 12 is connected to the vehicle bottom 4 by the retaining means 30 consisting, in the example shown, of the holders 31, 32, 33 and 34, and the bolts 44 and the sleeves 50. Since the damping elements are resilient, each pipe 19, 21, 23 can move against the resistance of a force acting for the damping elements 42 during a deflection from their rest position. In this way, the damping elements 42 ensure that vibrations transmitted from the internal combustion engine to the exhaust system 11 are not transmitted to the chassis 5. Because the damping elements 42 are essentially right parallelepiped and have a through-hole 42a, movements in different directions are not opposed by the same resistance. Thus, for example, movements in the vertical direction are relatively strongly braked, so that only small deflections are possible. On the other hand, the holes 42a ensure that deflections in the longitudinal direction of the housings of the silencers, i.e. for example to left or right in FIG. 4, are opposed by relatively little resistance. Consequently, in the case of longitudinal expansions of the exhaust 11 due to its being heated up during operation, the damping elements 42 are deformed without excessively large forces being exerted on the weld joints 60, although the two silencer housings are connected to one another by the pipe 21 without inclusion of a bellows or other pipe element variable in length.

In the manufacture of the exhaust system, the inlet and collecting apparatus 13, the catalytic converter 14, the connection 15, the deformable pipe elements 16, 18, the pipes 17, 19, 21, 23, the silencers 20, 22 and the various parts of the holders 31, 32, 33, 34 are procured and/or produced in a first step. Thereafter, the sleeves 50 are pushed onto the pipes 21 and possibly 19 and 23 and temporarily fixed. This fixation can be achieved, for example, by pressing a sleeve onto the relevant pipe and a resultant press-fit connection and/or by temporarily connecting the sleeve to the pipe at at least one point and preferably a few points by spot welding. The sleeve 50 is then placed on the curved section 41d of a retaining member 41 and welded to the edges 41d. The time for which an arc or welding flame acts on the sleeve 50 is tailored to its thickness in such a way that each weld joint 60 simultaneously also connects the pipe and the sleeve 50 to one another, and the sleeve is fused with the pipe at each weld joint 60. Furthermore, before or after the retaining members 41 are welded on, the two silencer housings are connected to the pipes 19, 21, 23 by welding or brazing, and furthermore the other exhaust components are connected to one another by welding and/or by brazing.

Finally, it should also be mentioned that the exhaust system described above is by no means the only possible embodiment of the invention and can be modified in several respects. In the case of the second silencer 22 arranged behind the tunnel, the two retaining members coordinated therewith can be arranged, for example possibly on the upper side instead of on the lower side of the pipes 21, 23 and can be connected by means of sleeves to these pipes. Furthermore, these retaining members can then be suspended from damping elements engaging from above and can be suspended from connecting elements by means of said damping elements. Moreover, a holder may also have only one damping element 42. The shape of the elastomeric damping elements, too, may vary. Thus, these may be rotationally symmetrical instead of right parallelepiped and may be, for example, cylindrical and possibly also slightly indented in the middle region in axial section. They may furthermore have fastening and connecting means which are mushroom-shaped or otherwise formed and which, together with the damping element, consist of an integral member and, instead of the bolts 47, 48, connect the damping elements to the connecting element and to the retaining member. A damping element can however also be connected to the connecting element and/or to the retaining member by virtue of the fact that it has at least one cast or vulcanized threaded bush which is engaged by a bolt fastened to the connecting element or to the retaining member. The connecting element 43 and/or the retaining member 41 need not have a U-profile but may have other profile shapes. If the exhaust has at least one pipe which is connected to a silencer and, like the pipes 19 and 23 of the embodiment shown, is only very short, this pipe may have a wall with a thickness which is, for example, more than 1 mm. In the case of such a pipe, it may then be possible to omit the sleeve 50 and to fasten the associated retaining member directly to the pipe by welding or brazing. In the case of such a modification, a sleeve 50 could then be present only in the case of one of the two pipes connected to a silencer housing. Instead of a catalytic converter and two silencers, the exhaust system may also have only one catalytic converter and one silencer or two catalytic converters and at least one silencer or a combined catalytic converter/silencer and a further silencer. For example, a catalytic converter, or a catalytic converter having a common housing together with the silencer, could be arranged upstream of the two elastically deformable, flexible pipe elements 16 and 18. A catalytic converter or catalytic converter/silencer arranged in this manner could then have a housing which is connected on both sides to pipes and via these analogously to holders, as was described for the first silencer 20.

Otherwise, reference may also be made to the European Patent Application Publication 0 807 749 already cited and also to European Patent 0 875 409 Application Publication and European Patent Application Publication 0 875 410 as well as the corresponding U.S. Pat. No. 6,058,702 applications Ser. No. 09/067,430 (1998) and Ser. No. 09/067,504 (1998), respectively, the content of which is hereby incorporated in the present Patent Application, provided that there are no contradictions.

What is claimed is:

1. An exhaust system for a motor vehicle having a vehicle body and an internal combustion engine, the exhaust system comprising an exhaust for connection to the internal combustion engine and having at least one housing of at least one of a silencer and a catalytic converter with the housing including a housing casing having a wall thickness of not more than 1 mm, and two housing ends, the exhaust further having metallic pipes which are rigidly connected to the housing and at least one of which has a wall thickness of not more than 1 mm; and retaining means for holding the exhaust on the vehicle body, wherein the retaining means have a holder for each pipe connected to a housing end, wherein a sleeve surrounding the at least one pipe is fastened to the at least one pipe, wherein each holder comprises a retaining member adjacent to a circumferential section of one of the sleeve and the at least one pipe and is fastened to at least one of the sleeve and the at least one pipe by at least one of welding and brazing and has, at opposite ends of the circumferential section of the at least one of the sleeve and the at least one pipe, arms projecting away from the sleeve or from the at least one pipe, wherein each holder further comprises a substantially rigid metallic connecting element rigidly connectable to the vehicle body, and two damping elements, and wherein each damping element comprises a vibration damping member and connects one of the arms of the retaining members to the connecting element.

2. The exhaust system as claimed in claim 1, wherein each retaining member is adjacent to a circumferential section of one of the sleeves and the pipe and is fastened to at least one of the sleeve and the pipe by one of welding and brazing.

3. The exhaust system as claimed in claim 2, wherein the or each retaining member fastened to the sleeve has two edges extending along the circumferential section of the sleeve and adjacent to the sleeve, and wherein the or each sleeve is welded at these edges both to the retaining member and to the pipe surrounded by the sleeve.

4. The exhaust system as claimed in claim 1, wherein each retaining member has a web and two limbs and is U-shaped in cross-section, and wherein the two limbs have edges which face away from the web and rest against one of the at least one sleeve and the pipe.

5. The exhaust system as claimed in claim 1, wherein the housing has a housing axis and two end walls facing away from one another and making an angle with the housing axis, and wherein a distance b, measured along the housing axis, between points located closest together of each of the end walls and of the retaining member located in the vicinity of the housing end as respective walls is 5 cm.

6. The exhaust system as claimed in claim 1, wherein the housing has a housing axis and two end walls facing away from one another and making an angle with the housing axis, and wherein a distance b, measured along the housing axis, between points located closest together of each of the end walls and of the retaining member located in the vicinity of the housing end as respective walls is 3 cm.

7. The exhaust system as claimed in claim 1, wherein the housing casing has a wall thickness of not more than 0.8 mm.

8. The exhaust system as claimed in claim 1, wherein the housing casing and retaining means associated with the housing casing do not contact each other.

9. The exhaust system as claimed in claim 1, wherein each vibration-damping member is elastomeric.

10. The exhaust system as claimed in claim 11, wherein each vibration-damping member is fastened to one of the arms of the retaining member and to the connecting element.

11. A motor vehicle, having a vehicle body, an internal combustion engine, an exhaust system, and wheels which rest on a horizontal surface when a motor vehicle is in a normal position, wherein the exhaust system comprises an exhaust which is connected to the internal combustion engine and has at least one housing of at least one of a silencer and of a catalytic converter with a housing casing having a wall thickness of not more than 1 mm, and two housing ends, and metallic pipes which are rigidly connected to the housing and at least one of which has a wall thickness of not more than 1 mm, the exhaust further having retaining means for holding the exhaust on the vehicle body, wherein the retaining means have a metallic retaining member for each pipe connected to a housing end, wherein a sleeve surrounding the at least one pipe is fastened to the at least one pipe, the retaining member being fastened to said sleeve, wherein, in the normal position, a lowest point of the at least one housing is below a lowest point of the retaining members associated with the housing, wherein the vehicle body has a vehicle bottom having a tunnel which is open at the bottom and in which at least one cross-sectional area of the at least one housing is arranged, wherein the retaining member associated with the at least one housing is arranged completely in the tunnel, is formed of a metallic material and is connected by damping elements, each of which has a vibration damping member, to a metallic connecting element which rests on and is fastened to the vehicle bottom on both sides of the tunnel.

12. The motor vehicle as claimed in claim 11, wherein each vibration-damping member is elastomeric.

13. The motor vehicle as claimed in claim 11, wherein the retaining member has two arms projecting away from the sleeve and each of which is connected to one of said damping elements.

14. The motor vehicle as claimed in claim 13, wherein each vibration-damping member is fastened to one of the arms of the retaining member and to the connecting element.

15. A motor vehicle having a vehicle body, an internal combustion engine, an exhaust system, and wheels which rest on a horizontal surface when a motor vehicle is in a normal position, wherein the exhaust system comprises an exhaust which is connected to the internal combustion engine and has at least one housing of at least one of a silencer and of a catalytic converter with a housing casing, having a wall thickness of not more than 1 mm, and two housing ends and metallic pipes which are rigidly connected to the housing and at least one of which has a wall thickness of not more than 1 mm, the exhaust further having retaining means for holding the exhaust on the vehicle body, wherein the retaining means have a metallic retaining member for each pipe connected to a housing end, and wherein a sleeve surrounding the at least one pipe is fastened to said pipe, the retaining member being fastened to said sleeve, wherein, in the normal position, a lowest point of the at least one housing is below a lowest point of the retaining members associated with the housing, wherein at least one retaining member rests against a circumferential section of the sleeve and has arms projecting away from the sleeve, wherein each arm has a damping element with a vibration-damping member and is connected thereto, and wherein each of these damping elements is connected to a metallic connecting element fastened to the vehicle body, and wherein the vibration damping members are arranged in such a way that in the normal position, the vibration damping members of the damping elements are subjected essentially only to a pressure load by a weight of the exhaust.

16. The motor vehicle as claimed in claim 15, wherein each vibration-damping member is elastomeric.

* * * * *